April 11, 1950  J. H. FORSYTH  2,504,015
ANIMAL TRAP
Filed March 5, 1947
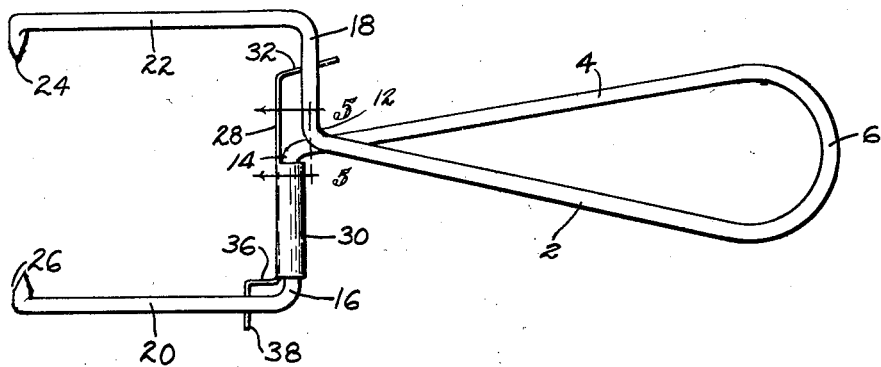
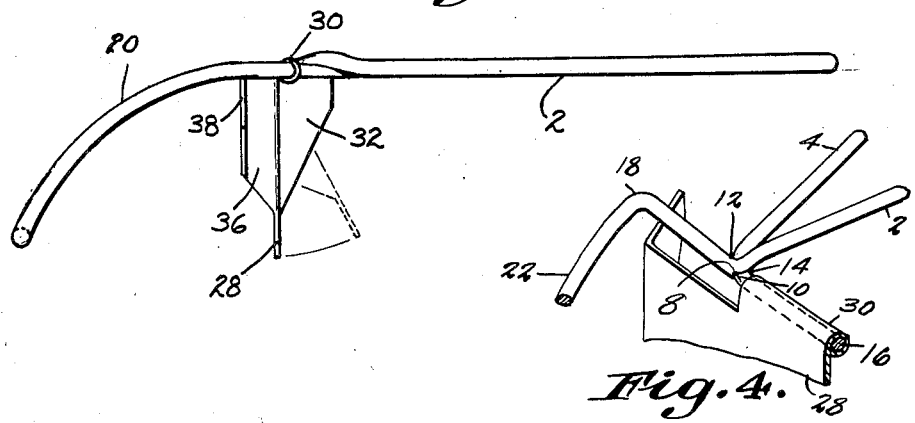
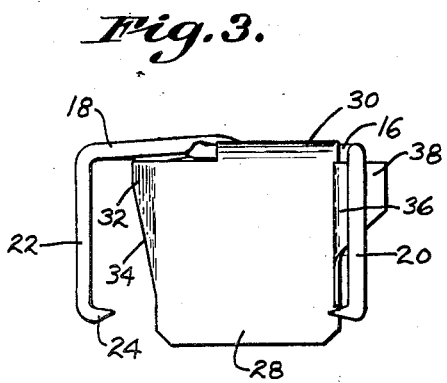
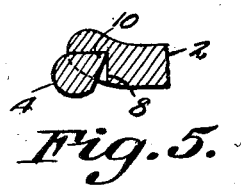
J. H. Forsyth
INVENTOR.
BY C. A. Snowles
ATTORNEYS.

Patented Apr. 11, 1950

2,504,015

UNITED STATES PATENT OFFICE 2,504,015

ANIMAL TRAP

Joseph H. Forsyth, Santa Ynez, Calif.

Application March 5, 1947, Serial No. 732,511

2 Claims. (Cl. 43—93)

My present invention relates to an improved animal trap of the type especially adapted for the trapping of gophers and other animals of like habits comprising generally a spring wire, the ends of the wire being so formed as hereinafter described so that the trap may be set by merely squeezing together the two spring ends, the latch mechanism automatically operating to set the trap as the spring ends are squeezed.

In the acompanying drawings I have illustrated one complete example of the physical embodiment of my invention according to the best mode I have thus far devised but it will be understood that various changes and alterations may be made in the exemplified structure within the scope of the appended claims.

In the drawings:

Figure 1 is a top plan view of the trap of my invention.

Figure 2 is a side elevational view thereof.

Figure 3 is an end elevational view.

Figure 4 is a detail view of the latching device for securing the compressed ends.

Figure 5 is a sectional view taken on line 5—5 of Figure 1.

Referring now to the drawings in detail wherein I have illustrated the present embodiment of my invention I employ the spring wire arms 2 and 4 joined with the loop 6 which tends to expand the arms, the arms 2 and 4 also crossing each other.

The arms 2 and 4 are provided respectively with a co-acting notch 8 and tooth 10 near the lateral bends 12 and 14 respectively, the tooth having a knife-like edge, and as will be hereinafter described, when the arms are compressed to set the trap, the tooth and notch will interengage or interlock to releasably secure the arms in compressed position.

Beyond the lateral bends 12 and 14 I provide the offsets 16 and 18 respectively on the arms 4 and 2, and the arms are then curved downwardly as at 20 and 22, the arm 22 terminating in a point 24 while the arm 20 terminates in a point 26.

A trip plate 28 is rolled along one edge to form a hinge 30 journaled on the offset 16, and this trip plate is fashioned with an angular shoulder 32 formed with a converging edge 34. On the opposite side of the trip plate 28 the edge portion thereof is disposed at right angles to the plate to form the wall 36 and angularly of this wall I utilize the abutment 38.

With the trap in sprung or unset position the arms 2 and 4 will be substantially parallel, the plate lying in the same horizontal plane as the arms, and the curved portions 20 and 22 of the arms crossed.

To set the trap, the arms 2 and 4 are compressed by one hand, the plate being free to assume its set position, whereupon the offset 18 of the arm 2 will engage the shoulder 32 to elevate the trip plate while the notch and tooth 8 and 10 become interlocked. As the animal approaches the trap between the separated curved portions 20 and 22 of the spring arms, being attracted by suitable means he will touch the plate, pivoting the plate even slightly and the shoulder 32 will move the arm 18 to separate the arms slightly whereupon the arm will become disengaged and the trap will spring, the curved arm portions 20 and 22 embracing the animal to secure him.

Having thus fully described my invention what I claim as new and desire to secure by Letters Patent is:

1. An animal trap comprising spring arms releasably interengaged when spread, a plate pivotally connected to one arm, a shoulder extending from one side of the plate across the path of the other arm to elevate the plate simultaneously with spreading of the arms, said shoulder remaining crosswise of said other arm in the spread position of the arms to exert arm-disengaging pressure thereagainst on movement of the plate in one direction responsive to an animal-and-plate contact, and an abutment on the other side of the plate disposed crosswise of the first named arm in the elevated position of the plate to prevent movement of the plate in the opposite direction.

2. An animal trap comprising spring arms releasably interengaged when spread, a plate pivotally connected at one end to one arm, a shoulder integral with and extending angularly from one side edge of the plate across the path of the other arm to elevate the plate responsive to spreading of the arms, said shoulder remaining crosswise of said other arm in the spread position of the arms to exert arm dis-engaging pressure thereagainst responsive to movement of the plate in one direction upon an animal-and-plate contact, and an offset abutment integral with and extending from the other side edge of the plate transversely of the first named arm and engaging said first named arm in the elevated position of the plate to prevent plate movement in the opposite direction.

JOSEPH H. FORSYTH.

REFERENCES CITED

The following references are of record in the file of this patent:

UNITED STATES PATENTS

| Number | Name | Date |
|---|---|---|
| 580,788 | Killefer | Apr. 13, 1897 |
| 778,777 | Gates | Dec. 27, 1904 |
| 1,222,063 | Bittle | Apr. 10, 1917 |
| 1,271,372 | Roy | July 2, 1918 |